United States Patent [19]
Kite et al.

[11] Patent Number: 5,737,517
[45] Date of Patent: Apr. 7, 1998

[54] TESTING TOOLS IN AN INTELLIGENT NETWORK SYSTEM

[75] Inventors: Kurt Kite; Hans Gundersen, both of Richardson, Tex.

[73] Assignee: Ericsson, Inc., Research Triangle Park, N.C.

[21] Appl. No.: 577,913

[22] Filed: Dec. 21, 1995

[51] Int. Cl.⁶ ...................................................... G06F 11/00
[52] U.S. Cl. ................... 395/183.14; 395/183.09; 395/500; 379/10
[58] Field of Search ............... 395/183.14, 182.02, 395/183.19, 183.16, 183.09, 183.04, 200.3, 200.76, 200.66, 500; 371/20.1, 20.2, 20.3, 20.4; 379/1, 10

[56] References Cited

U.S. PATENT DOCUMENTS

| | | | |
|---|---|---|---|
| 5,084,816 | 1/1992 | Boese et al. | 395/182.02 |
| 5,278,823 | 1/1994 | Handel | 370/13 |
| 5,359,646 | 10/1994 | Johnson et al. | 379/27 |
| 5,384,822 | 1/1995 | Brown et al. | 379/10 |
| 5,430,727 | 7/1995 | Callon | 370/85.13 |
| 5,517,563 | 5/1996 | Norell | 379/220 |
| 5,521,902 | 5/1996 | Ferguson | 379/10 |
| 5,579,368 | 11/1996 | Van Berkman | 379/10 |
| 5,583,848 | 12/1996 | Glitho | 370/248 |
| 5,623,604 | 4/1997 | Russell et al. | 395/183.14 |
| 5,627,886 | 5/1997 | Bowman | 379/111 |
| 5,631,948 | 5/1997 | Bartholomew et al. | 379/67 |
| 5,633,909 | 5/1997 | Fitch | 379/15 |
| 5,633,919 | 5/1997 | Hogan et al. | 379/115 |

Primary Examiner—Robert W. Beausoliel, Jr.
Assistant Examiner—Joseph E. Palys
Attorney, Agent, or Firm—Jenkens & Gilchrist, P.C.

[57] ABSTRACT

Service Control Point (SCP) and Service Data Point (SDP) software modules within an Intelligent Network telecommunications system are function tested using a UNIX environment. Transaction Capabilities Application Part (TCAP) messages are generated using a simulator and transported over a Local Area Network (LAN) such as Ethernet. TCAP messages are encapsulated using Transmission Control Point/Internet Protocol (TCP/IP) packets and transported over the Ethernet. A LAN card is installed on the SCP or SDP to interface with the Ethernet in order to receive the transmitted encapsulated TCAP messages. Alternatively, UNIX based SCP or SDP software modules are loaded onto a UNIX based work-station and receive the transmitted encapsulated TCAP messages over the Ethernet. Resulting TCAP messages generated by the software modules are compared against the expected data and the functionality of the software modules is accordingly function tested.

26 Claims, 7 Drawing Sheets

TESTING TOOLS IN AN INTELLIGENT NETWORK SYSTEM

CROSS REFERENCE TO RELATED APPLICATION

This application is related to U.S. application for patent Ser. No. 08/576,509, filed Dec. 2, 1995, entitled Test Message Generator in a Telecommunications Network (Docket No. 27943/36).

BACKGROUND OF THE INVENTION

1. Technical Field of the Invention

The present invention relates to a testing environment in a telecommunications system and, in particular, to the testing of Service Control Point (SCP) and Service Data Point (SDP) software modules within an Intelligent Network (IN).

2. Description of Related Art

With the developments and improvements in sophisticated telecommunications applications, the telecommunications industry has adopted the term "Intelligent Network (IN)" to denote a concept and architecture for providing vendor-independent and network-independent interfaces between the service logic and the transmission and switching system of a multi-enterprise telecommunications network. The goals of the IN are to centralize the control node handling the service execution within a telecommunications network to provide rapid definition, testing and introduction of new services as well as modifications of existing services. IN also provides greater flexibility in the design and development of new services in a multi-vendor environment with shorter lead time, and standard network interfaces.

Accordingly, the basic concept behind IN is to move the intelligence out of each local exchange or Service Switching Point (SSP) and centralize the services providing the intelligence in a Service Control Point (SCP). By centralizing the special subscriber services in an SCP, a new service can be added in only one place and provided to all subscribers connected to the multiple SSPs which are connected to the SCP. Consequently, a larger number of subscribers connected by way of multiple SSPs are serviced by a single SCP.

Unfortunately, such a distributed-system configuration adds additional burdens on the SCP to create an error-free environment and still guarantee safe, nearly-instant deployment. In order to guarantee such safe and error-free systems, SCP developers must maintain a separate test lab duplicating the above real-time distributed-system configuration for function test purposes. Before a new software module is installed on a live SCP or SDP (SCP/SDP), it must undergo arduous function testing procedures at a test lab to ensure that the new module and its functionality will perform correctly.

Maintaining such a test lab is both expensive and cumbersome. It is expensive because, even though it is only the software modules that need to be tested, the test lab must be physically equipped with all the necessary devices and components (i.e., hardware) to duplicate the real environment. It is cumbersome because setting up the required test lab configurations is always a tedious process, especially if more than one test personnel uses the same lab for different test purposes or configurations. It is also more difficult to debug and perform a function test on a real-time telecommunications environment because of a lack of testing tools and capabilities. Furthermore, where software modules are being developed concurrently with hardware modules and devices, there might not be a test lab available to provide the necessary platform for new software modules to be tested. Since software modules need to be function tested during each development phase of a project, such a concurrent development creates an undesirable delay on the overall project development.

A number of testing devices and simulators have been produced and marketed in order to alleviate the above problems. Such devices or simulators are connected to an exchange via a Signaling System No. 7 (SS7) communication link and generate SS7 signals to test the internal execution of the software modules within a telecommunications exchange. However, such test configurations still require an SS7 telecommunications network along with all other necessary hardware and software modules to properly test software modules residing within an SCP or SDP.

Accordingly, it would be advantageous to provide a computer simulator to generate and transmit the necessary telecommunications signals in order to perform a function test on and to ensure the functionality of new SCP or SDP software modules before they are deployed in a live networking environment. Such a simulator replaces an expensive SSP node while generating the necessary TCAP messages to properly perform function tests on new SCP or SDP software modules.

It would be further advantageous to test SCP/SDP software modules using a non-SS7 communications link. However, an SCP/SDP communicates with an SSP by links utilizing the SS7 Transaction Capabilities Application Part (TCAP) protocols in an IN. Therefore, in order to prevent modifications to the interface portion of the SCP/SDP software modules, the platform supporting the testing software modules needs to receive and transmit TCAP messages. Accordingly, it would be advantageous to transmit TCAP messages across a non-SS7 telecommunications link such as a Local Area Network (LAN).

Real-time SCP/SDP platforms are usually strictly constructed with limited memory space and testing tools to meet tight real-time constraints. Accordingly, performing a function test directly on a real SCP/SDP platform connected to an IN system is difficult and restrictive. Due to the portability and compatibility afforded by the UNIX environment, it is better to perform function tests UNIX based SCP/SDP software modules using a platform other than a real-time SCP/SDP platform. By performing the function tests on a UNIX based work-station, testing and debugging tools not available on a real-time SCP platform are available for use.

SUMMARY OF THE INVENTION

Instead of using an expensive and cumbersome IN telecommunications network to test a new SCP or SDP software module, a simulator is used to produce the needed TCAP messages in accordance with a pre-stored test script file. The generated TCAP messages are encapsulated using a communications packet protocol such as Transmission Control Point/Internet Protocol (TCP/IP) and communicated toward a platform supporting the new SCP or SDP software module via an ubiquitous local area network (LAN) such as Ethernet. Once the TCP/IP packets are received by the platform supporting the new software modules, an interface module extracts the encapsulated TCAP messages and transfers them to the appropriate software modules to effectuate desired internal execution.

Instead of loading a new SCP or SDP software module onto a real SCP or SDP telecommunications node, the new software module is loaded onto a work-station which is connected to the TCAP simulator via a LAN. Alternatively, the simulator generating the needed TCAP messages and the platform supporting the new software modules can be concurrently processed by a single work-station with multitasking capabilities.

Accordingly, the present invention provides a method and apparatus for function testing a software module within an IN telecommunications system by utilizing a TCAP simulator and a non-telecommunications link.

In another aspect, the present invention provides a system for encapsulating TCAP messages into TCP/IP packets and transporting the packets over a LAN connection.

In yet another aspect, the present invention provides a system for loading a SCP/SDP software module onto a work-station for function test purposes.

In a further aspect, the present invention provides a system for verifying proper execution of a SCP/SDP software module by generating TCAP messages via a work-station, transporting the generated TCAP messages encapsulated into TCP/IP packets over a LAN connection, and effectuating internal execution of the software module by inputting the received TCAP messages to the software module.

In a still further aspect, the present invention provides a system wherein the work-station generating the TCAP messages and the work-station loading and supporting the new software modules are a single work-station with multitasking capabilities.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
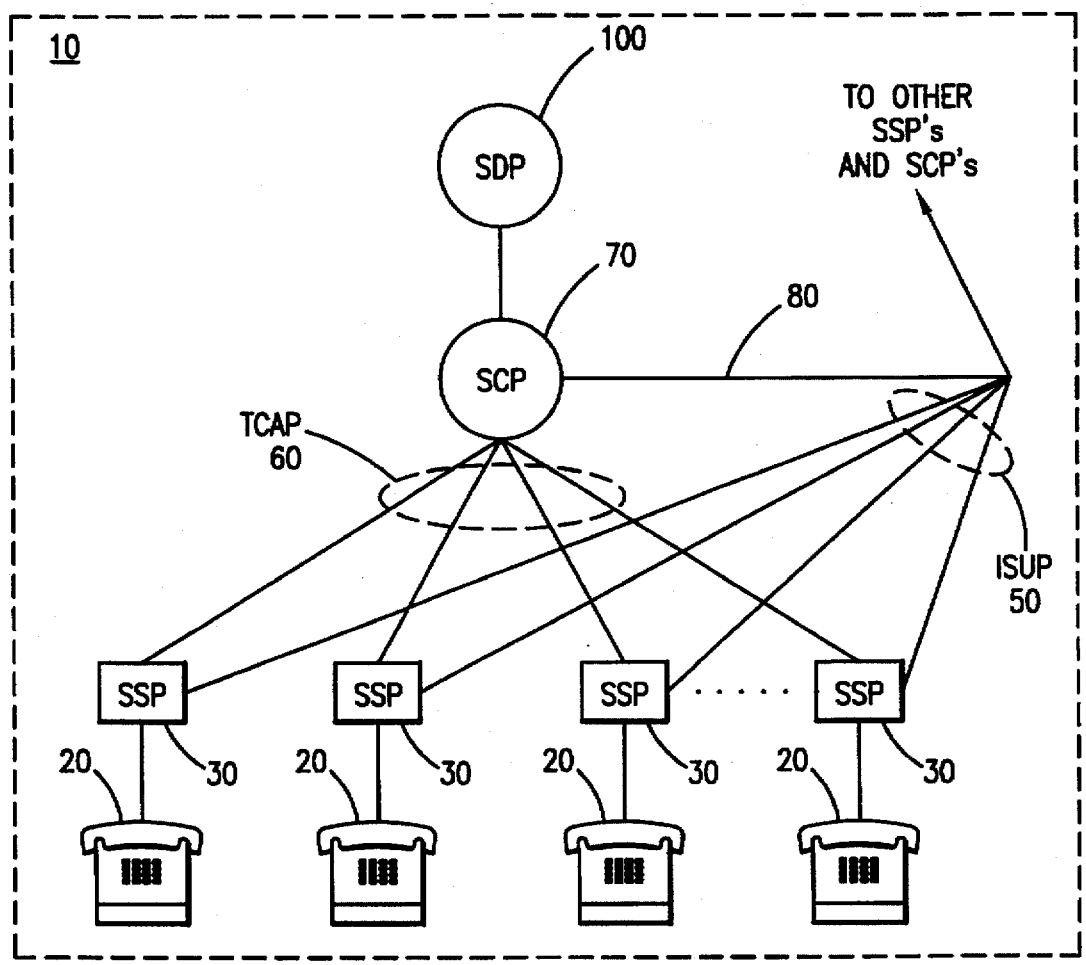
FIG. 1 is a block diagram illustrating a network configuration of an Intelligent Network (IN)

FIG. 1 shows an Intelligent Network (IN) in which the present invention, as will be disclosed herein, may be implemented. In a typical telecommunications network 10, there are virtually limitless local exchanges and other support computers interconnected with each other to provide telecommunications services to telecommunications subscribers. These local exchange switches and computers are manufactured by different vendors and each may have its own protocols and specifications. Each computer, and each application program in the computer, may require a different communication access method and protocol (i.e., a standard convention for communicating intelligently) for a viable "conversation" to proceed. This sets very specific requirements on either or both parties to the conversation in a form that they can recognize and manipulate. This may also involve protocol conversion to accommodate an end user's format, code, and language syntax.

The above problems have led the International Organization for Standardization (ISO) to launch an intensive effort to develop a worldwide communication architecture standard that would allow different systems to communicate openly and resulted in Reference Model for Open Systems Interconnection (OSI). However, it is not the intent of OSI either to be a basis for appraising the conformance of actual implementations, or to provide a sufficient level of details to define precisely the services and protocols or the interconnection architecture. Rather, OSI provides a conceptual and functional framework which allows users to work productively and independently on the development of standards for each layer of the Reference Model of OSI. Accordingly, each network has to develop its own set of detailed specifications conforming to the OSI model to actually achieve a compatible telecommunications network.

In the United States and worldwide, the most widely accepted OSI standard for telecommunications communication has been Common Channel Signaling (CCS) and the most commonly used technology for implementing the CCS standard has been the Common Channel Signaling System No. 7 (SS7) protocols created by the International Telephone & Telephone Consultative Committee (CCITT). The CCITT is a UN treaty organization made up of the postal, telegraph and telephone authorities of member countries and its recommended protocol SS7 is rapidly becoming recognized as the international standard. This CCS signaling system, designed using the concepts of packet switching and tailored to conform with the OSI model, has been developed for use with both national and international traffic, for local and long-distance networks, for interexchange signaling, and for various types of channels, including both terrestrial and satellite channels. Furthermore, the introduction of a packet-switched network used to carry call-signaling messages makes other data-handling services possible as well. These services include the Class Automatic Callback (CAC), Class Automatic Recall (CAR), and Calling Party Identification features.

Moreover, with the developments of the above mentioned special subscriber features and other sophisticated telecommunications applications, the telecommunications industry has adopted the term "Intelligent Network (IN)" to denote a concept and architecture to provide vendor-independent and network-independent interfaces between the service logic and the transmission and switching systems of a multi-enterprise telecommunications network. The goals of the IN are to centralize the control node handling the service execution within a telecommunications network to provide rapid definition, testing and introduction of new services as well as modification of existing services. IN also provides greater flexibility in the design and development of new services in a multi-vendor environment with shorter lead times, and standard network interfaces.

The basic concept behind IN is to move the intelligence out of each local exchange or Service Switching Point (SSP) 30 and centralize the services providing the intelligence in a Service Control Point (SCP) 70. By centralizing the special subscriber services in the SCP 70, a new service can be added in only one place and is provided to all subscribers connected to the multiple SSPs 30. Accordingly, one SSP 30 serves multiple telecommunications subscribers or terminals 20, and one SCP 70 serves multiple SSPs or local switches 30. The interfaces between SSPs 30 and the SCP 70 are by links 60 utilizing the SS7 Transaction Capabilities Application Part (TCAP) as the application layer protocol.

Hardware resources required to execute IN services are grouped and located separately from the SSP 70 in an Intelligent Peripheral (IP) 90. The purpose of such separation is to allow multiple SSPs 30 or SCPs 70 to share the same resources, to decrease processor load in the SSP 30 and the SCPs 70, and to provide common functionality to all IN services. The resources located in the IP 90 typically include, but are not limited to, audio announcements, speech synthesis, speech recognition, voice recognition, DTMF digit reception, audio conference bridges for conferencing, tone generators, storage of customer messages, modems, e-mail, fax, and operator resources. Accordingly, the IP 90 supports the ability for user interaction to allow collection of dialed digits or spoken input from users, as well as the provision of customized announcements to users. The interface between the SCP 70 and the IP 90 is a link 80 also utilizing the SS7 Transaction Capabilities Application Part (TCAP) as the application layer protocol. The reason TCAP is used instead of Integrated Service Digital Network (ISDN) User Part (ISUP) is because there is no need for a voice channel between the SCP 70 and the IP 90. The SCP 70 merely instructs the IP 90 via a data message to perform a certain specific function toward a specific subscriber, and the actual voice connection for providing special announcements or for collecting user voice for recognition is done via links 50. Furthermore, for additional telecommunications data, the SCP 70 interfaces with the SDP 100 via TCAP to query and retrieve the necessary information.

On the other hand, the interfaces between the IP 90 and the SSP 30 via links 50 are through ISUP which has the capability to also transport voice data. These interfaces allow telecommunications subscribers 20 connected to the SSPs 30 to hear and interact with resources located in the IP 90.

The interfaces between the SSPs 30 and the SCP 70 also utilize the TCAP links. No ISUP is needed because the responsibilities assigned to the SCP and SSP have been clearly delineated and separated from each other: the SSP (local exchange) controls basic telecommunications switching functions; and the SCP contains the advanced intelligence and logic to provide advanced telecommunications services to telecommunications users. The SCP 70 receives the state of call information from the SSP 30, ascertains the current call situation from that information, and returns call control commands back to the SSP 30 who in turn routes or controls the telecommunications call. Accordingly, the SCP 70 does not require any switching capabilities and can be developed more easily than and independently from the SSPs 30 using a more user friendly operating system environment such as UNIX.

As illustrated in FIG. 1, a single SCP 70 serves a multiple SSPs 60 via TCAP links 60. Due to the concentration of all the intelligence at the SCP 70, the SCP 70 must be able to maintain an error-free system in order to guarantee telecommunications services to a multitude of subscribers. Accordingly, whenever a new software module needs to be installed on a running SCP/SDP, the new module must undergo tremendously arduous function test procedures to verify and guarantee that such a module will perform correctly once installed on a live SCP/SDP. In order to perform such function tests, telecommunications vendors usually maintain separate test labs to duplicate the real IN network environment and to be able to function test the new software module under similar circumstances. Unfortunately, maintaining such test labs is very expensive and cumbersome because, even though it is only the software modules that need to be tested, all other interconnected modules and devices have to be installed in order to duplicate the real IN environment. Accordingly, it would be advantageous to substitute one of the nodes in the above IN network with a less expensive and more user friendly computer system.

Figure 2:
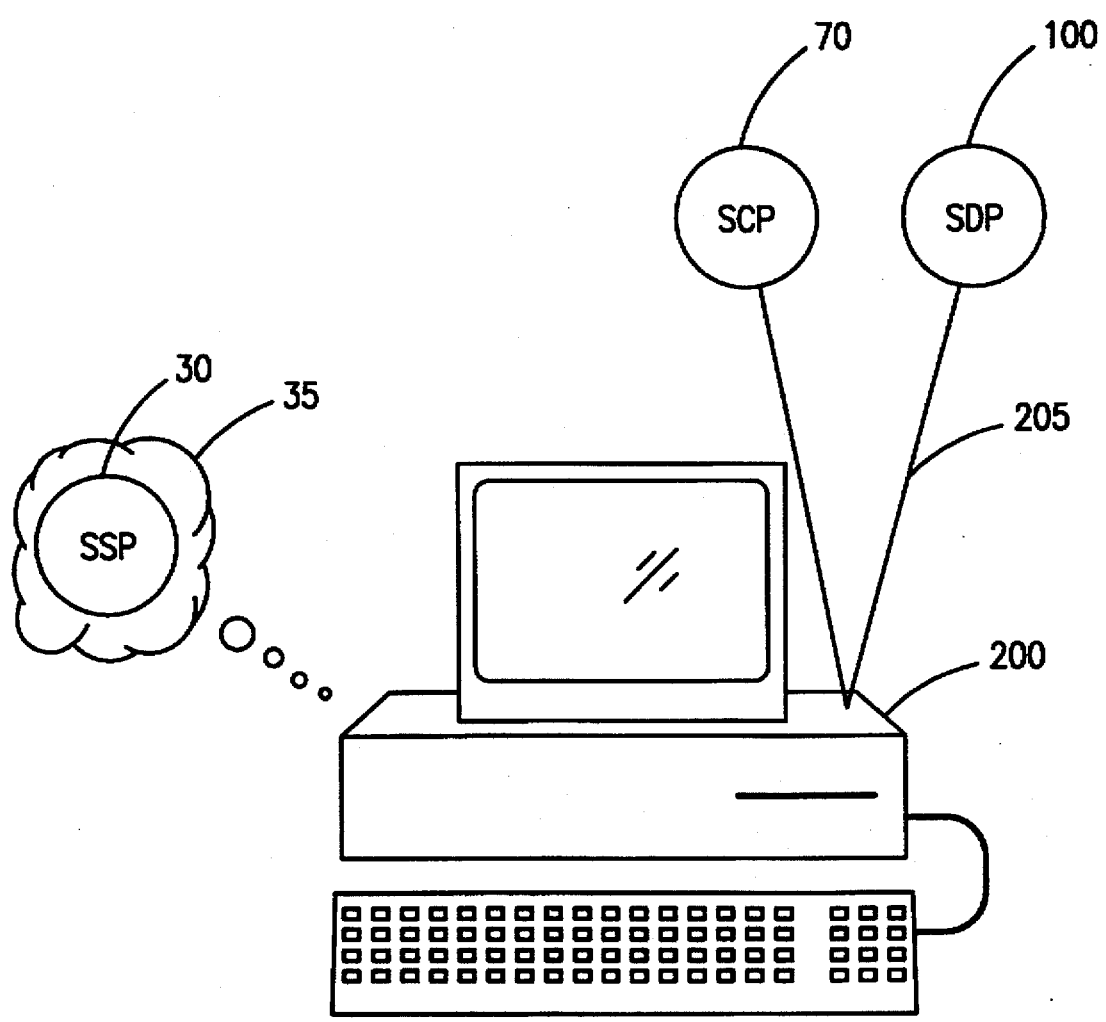
FIG. 2 is a block diagram of a test system illustrating a simulator connecting to a Service Control Point or Service Data Point (SCP/SDP)

FIG. 2 is a block diagram of a test system illustrating a simulator 200 substituting for a node in the IN system and connecting to an SCP 70 or SDP 100. In order to test new software modules for the SCP 70 or SDP 100, there is no need to provide a real SSP 30 as long as the simulator can generate and transmit the necessary TCAP messages to effectuate the internal execution of the new software modules. Such TCAP generation can be as simple as reading off of a test script file, formatting the data into a proper TCAP syntax and transmitting the data over a communication link. Most workstations or personal computers with minimum processing power can accommodate such requirements. Therefore, the simulator 200 replaces the SSP 30 as schematically shown by the bubble 35. The simulator 200, SCP 70 and SDP 100 are interconnected via a Local Area Network (LAN) 205 to exchange TCAP messages.

A LAN connects computers in a workgroup, department, or building and the maximum distance between each connected node is normally not more than a few kilometers. Typical data transmission speeds are one to ten megabits per second, with even higher speeds coming in as fiber optic links become more common. Even though there are a number of different LANs, Ethernet, which originated at Xerox in 1974 as a laboratory project, has become the best known local area network (LAN). As of late 1988, approximately 75 percent of the installed LANs used the Ethernet protocol.

Because of the fact that the SCP 70 and SDP 100 are not switching devices and are usually already equipped with LAN cards for communicating maintenance data with others, interconnecting the SCP 70 or SDP 100 with the simulator 200 via a LAN can be easily accomplished. Once the SCP 70, SDP 100, and simulator 200 are interconnected via the LAN 205, data can be inter-communicated using packet data such as Transmission Control Point/Internet Protocol (TCP/IP). The simulator 200 generates the necessary TCAP messages, communicates them to SCP/SDP over the Ethernet network using packets, and verifies the internal execution of the software modules using a non-SS7 telecommunications network.

Figure 3:
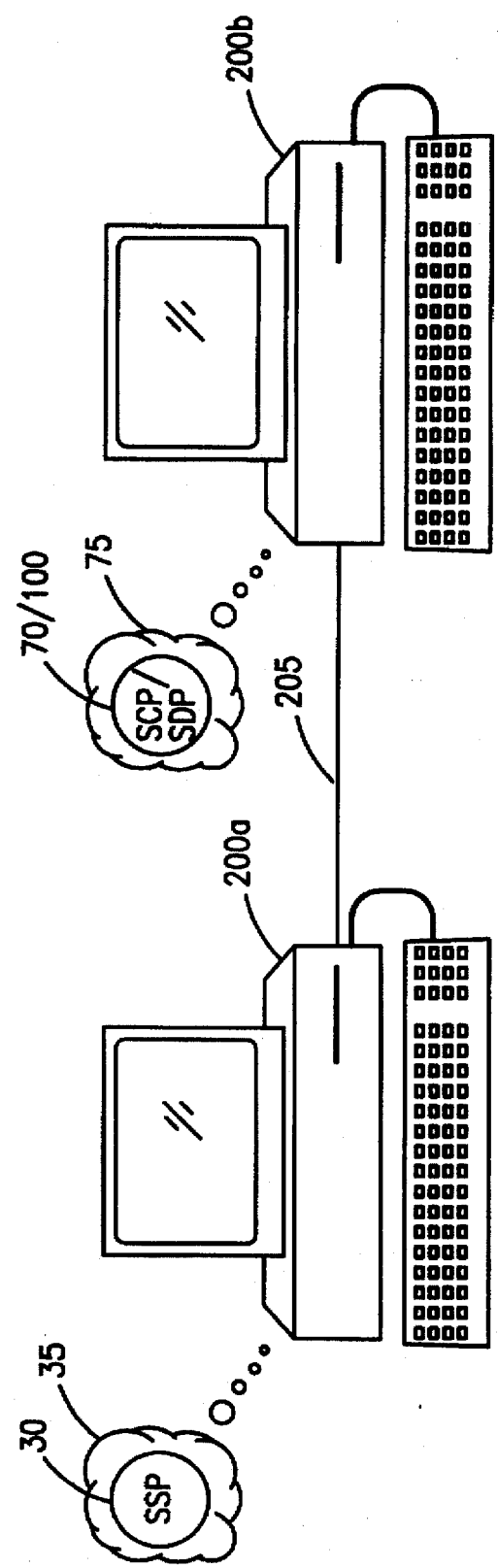
FIG. 3 is a block diagram of a test system illustrating a simulator connecting to a UNIX based work-station supporting new SCP/SDP software modules for testing purposes.

FIG. 3 is a block diagram of a test system illustrating a simulator connecting to a UNIX based work-station providing the necessary platform for testing new SCP/SDP software modules. SCP/SDP software modules can be implemented in the UNIX environment utilizing a UNIX language such as C or C++. Because of the fact that UNIX based products provide high portability and compatibility amongst each other, such SCP/SDP software modules can be easily easily developed and tested on a UNIX work station and later loaded onto the SCP or SDP. No emulators are needed to load such UNIX based SCP/SDP software modules onto a UNIX based work-station because the software modules are already compatible with any UNIX based work station or operating system. Since such UNIX work stations are usually interconnected with each other via a LAN, testing a new software module in such an environment does not require any additional devices or connections.

Accordingly, a work-station 200a simulates the task of the SSP 30, as schematically shown by the bubble 35, by generating and transmitting network protocol (TCP/IP) encapsulated TCAP messages over the LAN 205 to a work-station 200b. The work-station 200b is based on the UNIX environment and can load and support UNIX based SCP/SDP software modules without further modifications. As a result, the work-station 200b replaces the SCP 70 or SDP 100 as schematically shown by the bubble 75. Once the transmitted TCP/IP packets are received by the work-station 200b, the encapsulated TCAP messages are extracted by an interface module and transferred to the appropriate software module to effectuate internal execution of the software modules (the technique of encapsulating TCAP messages using TCP/IP packets is further described in detail in FIG. 5). Such UNIX based work stations comprise SUN workstations or Hewlett Packard work-stations.

Figure 4:
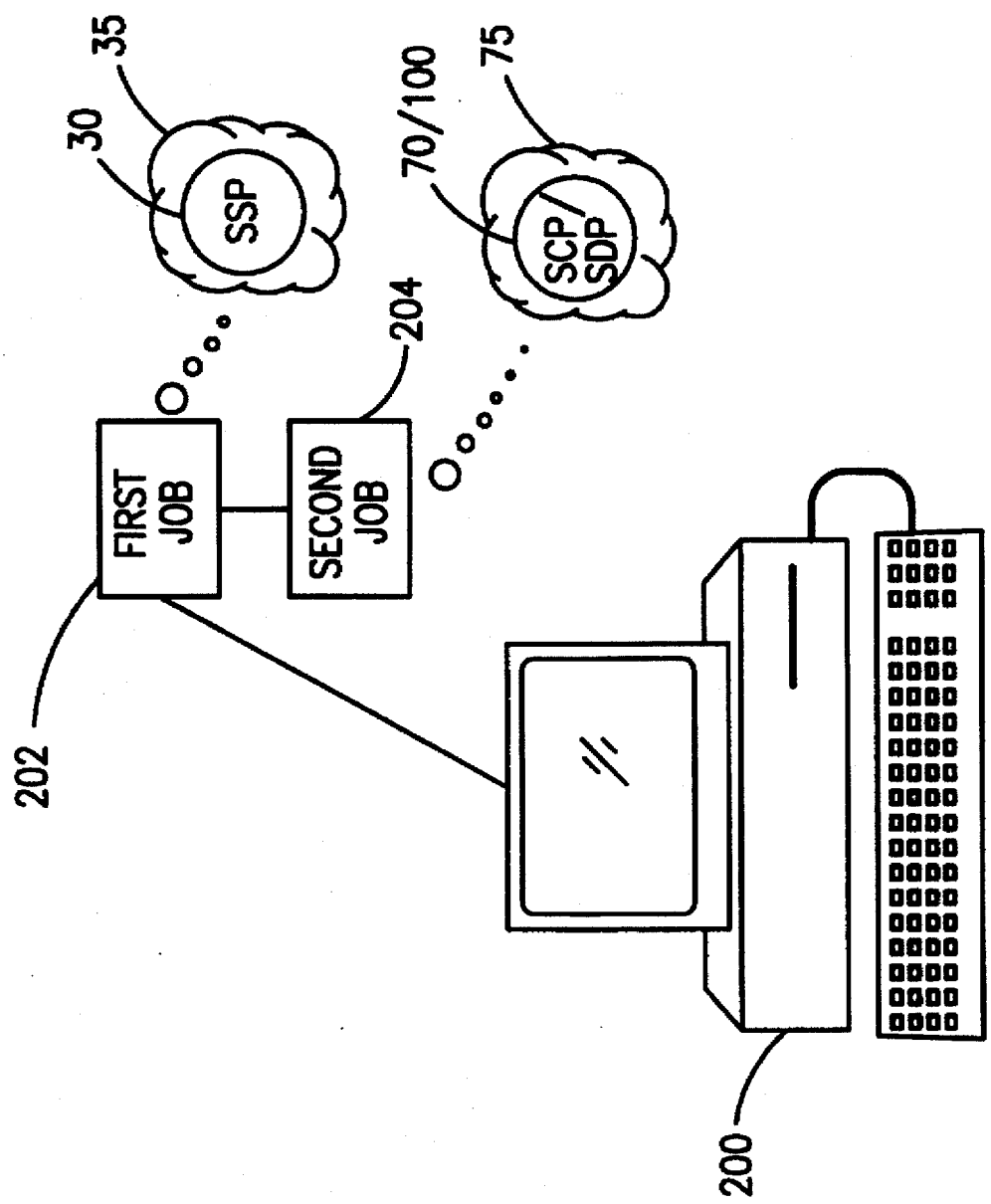
FIG. 4 is a block diagram of a test system illustrating a single UNIX based work-station concurrently supporting a simulator and a new SCP/SDP software module test platform.

FIG. 4 is a block diagram of a test system illustrating a single UNIX based work-station 200 supporting a simulator and concurrently providing a UNIX platform for testing new SCP/SDP software modules. Most of the work-stations available today in the markets are capable of multi-tasking and can easily handle more than two jobs at the same time. The work-station 200 simulates the SSP 30 as schematically depicted by the bubble 35 in accordance with a first processor job 202. The UNIX based platform 200 loads and supports the SCP 70 and SDP 100 as schematically depicted by the bubble 75 in accordance with a second processor job 204. Since jobs 202 and 204 handling both the simulator and the platform, respectively, for the SCP/SDP reside within the same work-station 200, the communications between the two jobs can be achieved by implementing a UNIX looparound link (not shown) or by utilizing internal processor signals. If the platform and the simulator are equipped to send and receive encapsulated TCAP messages, a looparound link is used to send and receive TCP/IP packets with encapsulated TCAP messages. For a simpler alternative, the first processor job can generate the TCAP messages and communicate them directly with the second processor job via UNIX internal signals and signal buffers.

Figure 5:
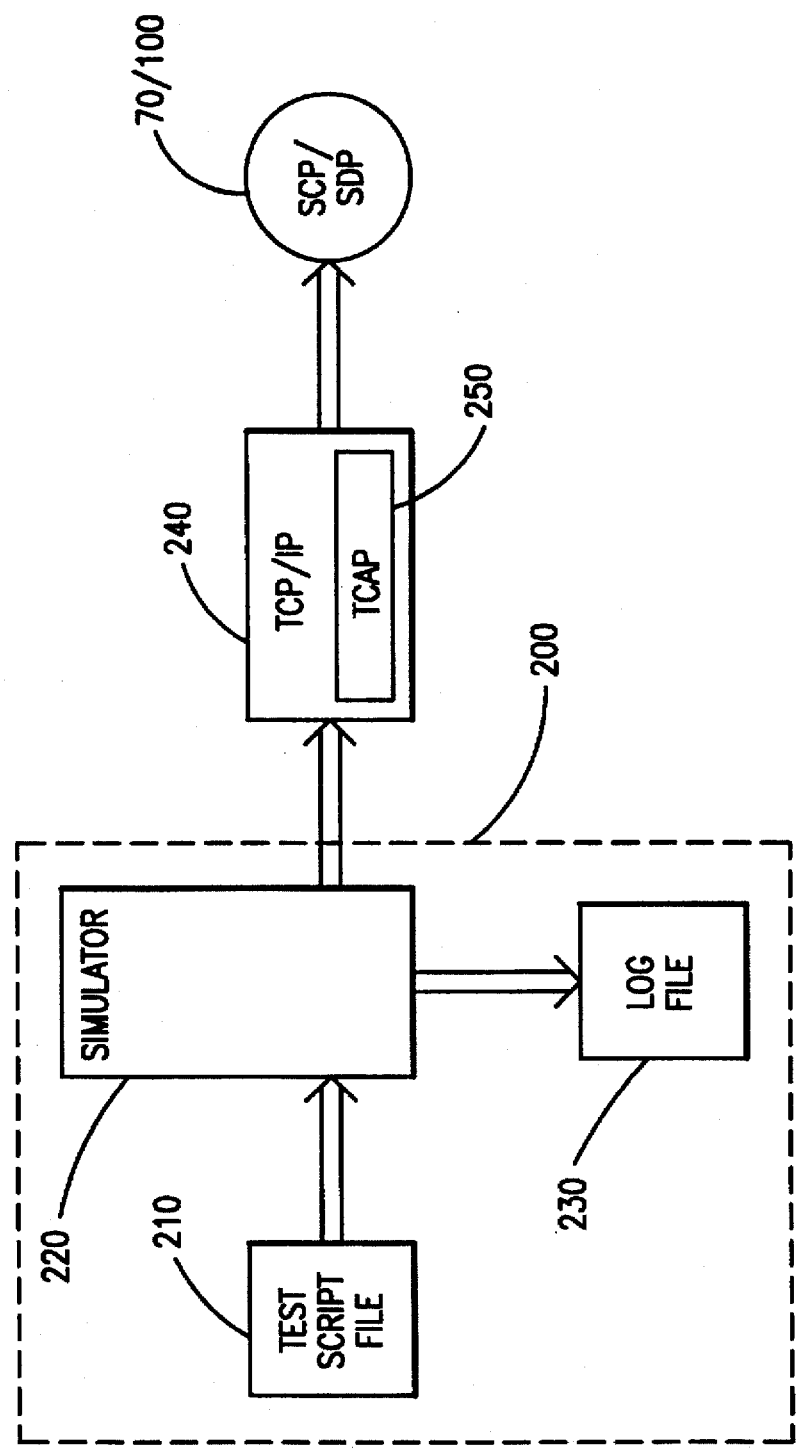
FIG. 5 is a block diagram illustrating the transmission of TCAP messages from a simulator toward an SCP/SDP via a Local Area Network (LAN)

FIG. 5 is a block diagram illustrating the transmission of encapsulated TCAP messages from the simulator (workstation) 200 toward the SCP 70 or SDP 100. The simulator module 220 within the simulator 200 reads test instructions from the test script file 210 and, in response to the data read from such a file, accordingly generates TCAP messages. As mentioned previously, the SCP 70 communicates with other nodes in the IN telecommunications system using TCAP messages. However, even though LANs can support a number of different communication protocols, SS7 TCAP messages are not supported. Therefore, in order to test the new software module via a LAN 205 without altering the communication protocol used by the new software, an interface system is needed between the TCP/IP protocol used for transmission over the network 205 and the TCAP protocol used by the SCP/SDP. As a result, according to the teachings of the present invention, the interface between TCAP messages and TCP/IP packets is achieved by encapsulating the TCAP messages using TCP/IP packets.

Encapsulation, sometimes called tunneling, is the insertion of one protocol's packet into another protocols packet. The encapsulated packet "piggy-backs" a ride on the packet of the native protocol for a ride over the native protocol's network. While this adds overhead, it provides a way to send packets from one network to another over an intermediate network that uses a different protocol. Accordingly, TCAP messages are encapsulated into TCP/IP packets and transported over the Ethernet network instead of the SS7 network. Once the transmitted TCP/IP packets are received by the Ethernet card at the other side, an interface module extracts the TCAP messages from the TCP/IP packets and routes them to the appropriate software modules. By encapsulating TCAP messages into TCP/IP packets, data can be transported using a non-SS7 protocol network, such as Ethernet and still maintain the original TCAP syntax and data structure. Such SCP 70 and SDP 100 can be a real live SCP or SDP node, or can be a UNIX based platform provided by a UNIX based work-station as mentioned during the description of FIG. 3. Once TCAP messages are generated and transmitted over the LAN, the messages are logged into the log file 230 for future reference.

Figure 6:
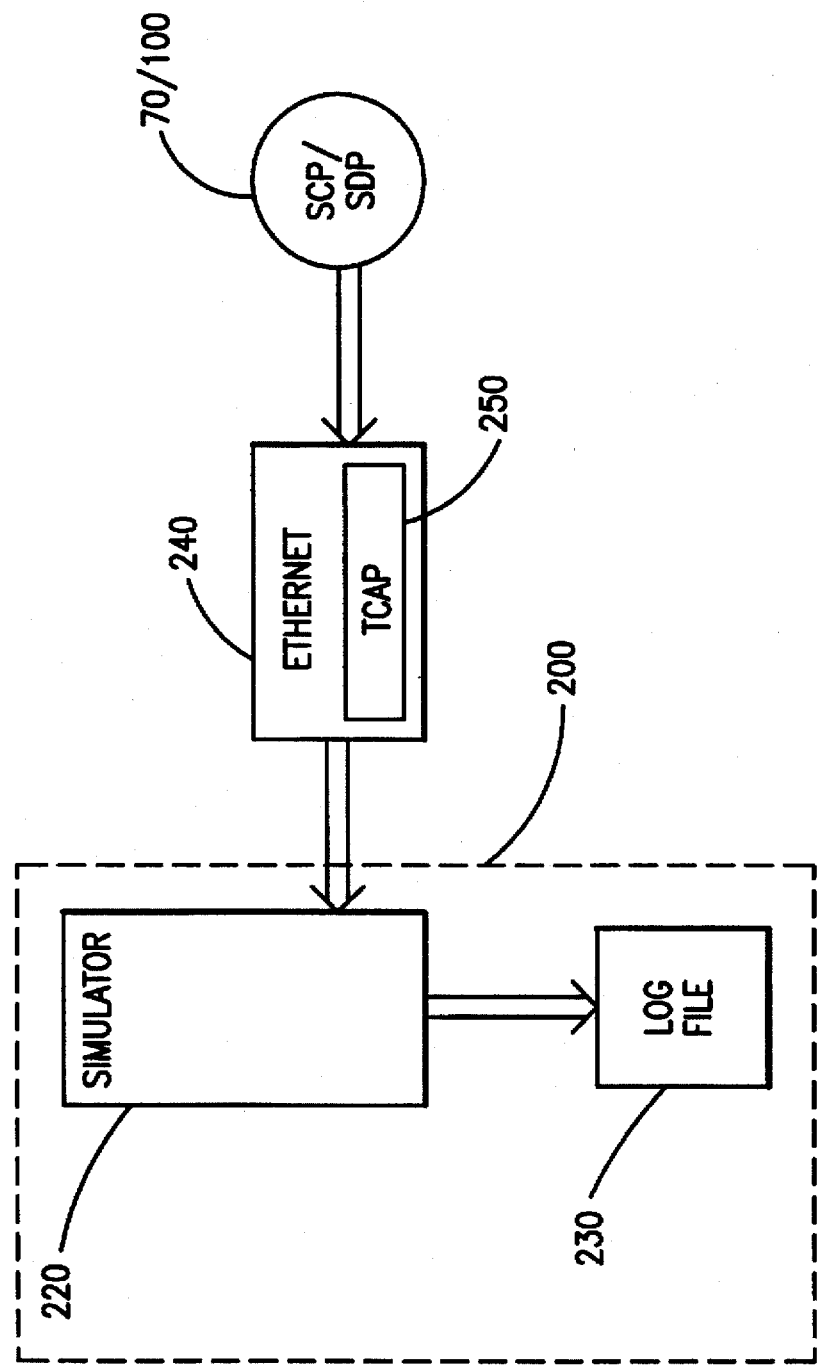
FIG. 6 is a block diagram illustrating the transmission of TCAP messages from an SCP/SDP toward a simulator via a LAN.

FIG. 6 is a block diagram illustrating the transmission of TCAP messages from the SCP 70 or SDP 100 toward the simulator 200. After the execution of the software modules in response to the received TCAP messages, the software module generates return messages in order to further effectuate telecommunications services within the IN telecommunications system. By examining the contents of the return TCAP messages, the test personnel is able to determine whether the software modules have performed correctly under the specific test scenario. Accordingly, such return TCAP messages 250 are once again encapsulated using TCP/IP packets 240 and transported back to the simulator 200 via the LAN. Once the encapsulated TCAP messages are received by the simulator module 220, the data in the TCAP messages are compared against the expected values specified by the test script file and an error message to the log file 230 is generated if there is a mismatch.

Figure 7:
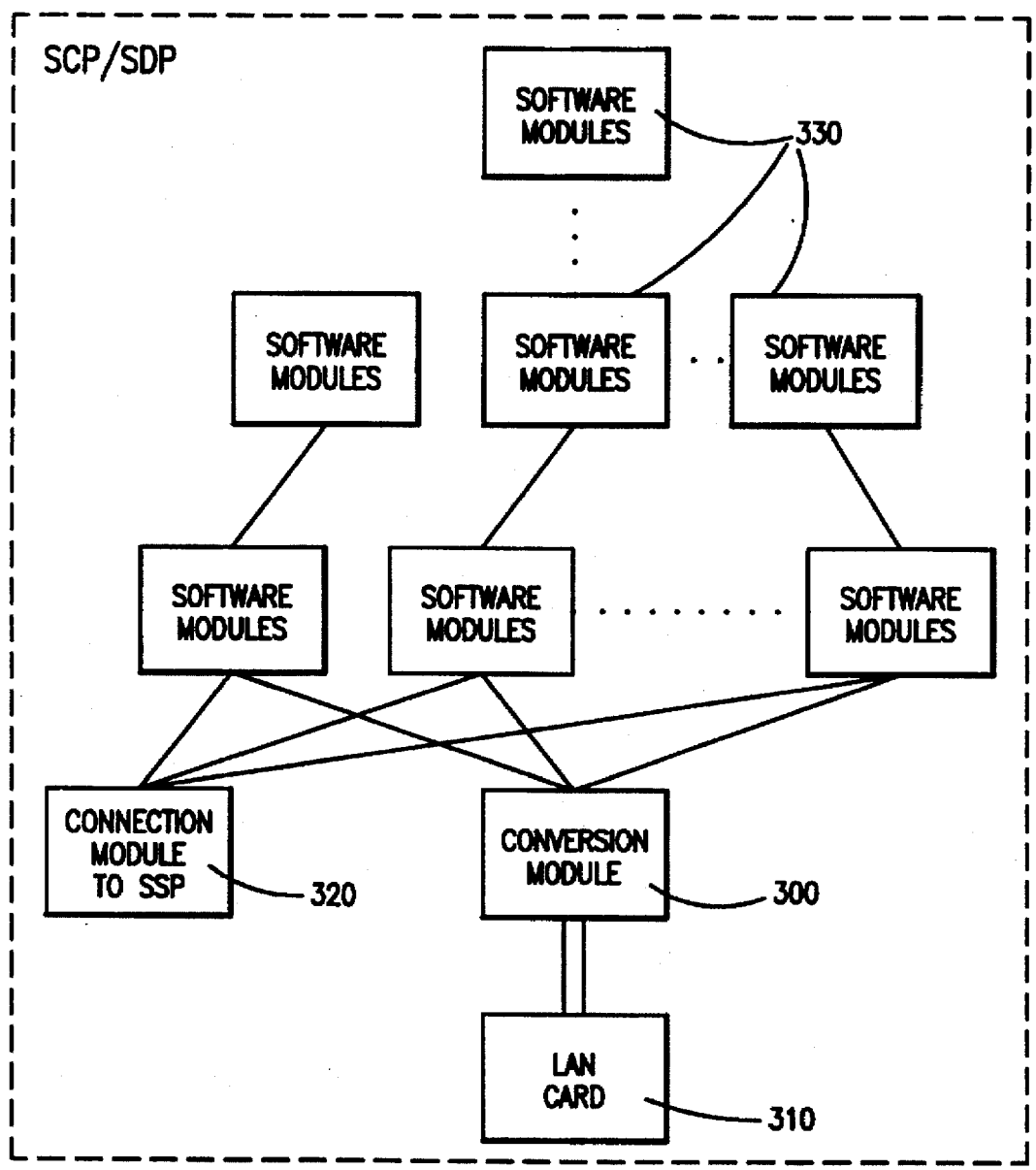
FIG. 7 is a block diagram illustrating a conversion module for interfacing SCP/SDP software modules with a LAN card.

FIG. 7 is a block diagram illustrating a conversion module within a real SCP or SDP node. The conversion module 300 interfaces the LAN card 310 with the rest of the software modules 330. During a normal operation as connected to the SS7 network, the software modules 330 interface with the SS7 network via the SS7 connection module 320. The SS7 connection module 320 receives TCAP messages along with the rest of CCS SS7 layer data and inputs the relevant TCAP data to the appropriate application layer software modules. However, during the function test phase, the LAN card 310 is utilized to communicate over a computer communication network such as Ethernet in accordance with the teachings of the present invention. Since TCP/IP packets received over the Ethernet network are encapsulated with TCAP messages, after receiving such packets, the conversion module 300 needs to extract the enclosed TCAP messages and transfer them up to the application layer software modules. Consequently, the software module would not be able to distinguish whether the TCAP messages came over the SS7 network or over Ethernet. After the software modules generate return TCAP messages as a result of the internal execution caused by the received TCAP messages, the conversion module 300 once again encapsulates the return TCAP messages using TCP/IP packets and inputs them to the LAN card 310. The LAN card 310, in turn, interfaces with the Ethernet network to transport the encapsulated TCAP messages back to the simulator 200. The simulator module 220 compares the received TCAP messages with its expected data and accordingly determines whether an error has occurred.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. An apparatus for performing function tests on Intelligent Network (IN) software modules external to a telecommunications network within which the software modules are to be installed, comprising:

a simulator for generating Transaction Capabilities Application Part (TCAP) messages for triggering execution of a software module to be tested;

a computer platform for executing the software module; and a Local Area Network (LAN) connecting said simulator with said computer platform for transporting TCAP messages, encapsulated in LAN communications packets, between said simulator and said computer platform.

2. The apparatus of claim 1 wherein said simulator comprises a UNIX based computer work-station.

3. The apparatus of claim 2 wherein said computer platform comprises a Service Control Point (SCP) node for use in an IN telecommunications system.

4. The apparatus of claim 3 wherein said SCP node comprises:

a LAN card for receiving communications packets transmitted over said LAN; and a conversion module for extracting said TCAP messages from said communications packets and interfacing said TCAP messages with the software module to be tested.

5. The apparatus of claim 2 wherein said computer platform comprises a Service Data Point (SDP) node for use in an IN telecommunications system.

6. The apparatus of claim 5 wherein said SDP node comprises:

a LAN card for receiving communications packets transmitted over said LAN; and a conversion module for extracting said TCAP messages from said communications packets and interfacing said TCAP messages with the software module to be tested.

7. The apparatus of claim 2 wherein said computer platform comprises a UNIX based computer work-station, said work-station loading and providing support for the software module to be tested.

8. The apparatus of claim 1 wherein said LAN communications packets comprise packet data based on the Transmission Control Protocol/Internet Protocol (TCP/IP) and said LAN comprises an Ethernet network.

9. The apparatus of claim 1 wherein said simulator comprises:

a test script file for storing test instructions executed by the simulator to generate the TCAP messages; and a log file for recording transmitted and received TCAP messages.

10. A method for performing function tests on a software module in a simulator external to a distributed-networking telecommunications system within which the software module is to be installed, said method comprising the steps of:

generating Transaction Capabilities Application Part (TCAP) messages;

encapsulating said TCAP messages into communications packets;

communicating said communications packets to the simulator coupled to said software module;

extracting said TCAP messages from said communications packets; and effectuating execution of said software module by the simulator in response to the receipt of said extracted TCAP messages.

11. The method of claim 10 wherein said step of generating said TCAP messages is effectuated by a UNIX based computer work-station simulating a Service Switching Point (SSP) of an Intelligent Network (IN) telecommunications system.

12. The method of claim 11 wherein said step of effectuating execution of said software modules further comprises the step of effectuating execution by a UNIX based computer work-station simulating a Service Control Point (SCP) node of an Intelligent Network (IN) telecommunications system.

13. The method of claim 11 wherein said step of effectuating execution of said software modules further comprises the step of effectuating execution by a UNIX based computer work-station simulating a Service Data Point (SDP) node of an Intelligent Network (IN) telecommunications system.

14. The method of claim 10 wherein said step of encapsulating said TCAP messages further comprises the step of encapsulating said TCAP messages into packets based on the Transmission Control Protocol/Internet Protocol (TCP/IP).

15. A system for performing function tests on a software module external to an Intelligent Network (IN) telecommunications system within which the software module is to be installed, said system comprising:

means for generating Transaction Capabilities Application Part (TCAP) messages for effectuating internal execution of a software module to be tested;

means for encapsulating said TCAP messages into communications packets;

means for communicating said encapsulated communications packets over a Local Area Network (LAN);

means for extracting said TCAP messages from said communications packets communicated over said LAN; and means for effectuating execution of said software module in response to the receipt of said extracted TCAP messages.

16. The system of claim 15 wherein said means for effectuating execution of the software module to be tested comprises a UNIX-based work station, said work-station loading and providing a simulated telecommunications platform for said software modules.

17. The system of claim 15 wherein said means for generating TCAP messages comprises a UNIX based computer work-station simulating a Service Switching Point (SSP) of said IN telecommunications system.

18. The system of claim 17 wherein said means for effectuating execution of the software module to be tested comprises a UNIX based computer work-station simulating a Service Control Point (SCP) node of said IN telecommunications system.

19. The system of claim 17 wherein said means for effectuating execution of the software module to be tested comprises a UNIX based computer work-station simulating a Service Data Point (SDP) node of said IN telecommunications system.

20. The system of claim 15 wherein said means for encapsulating said TCAP messages into communications packets comprises the means for encapsulating said TCAP messages into a Transmission Control Protocol/Internet Protocol (TCP/IP) based packets.

21. A system for verifying proper execution of an Intelligent Network (IN) telecommunications software module external to a telecommunications network within which the software module is to be installed, comprising:

- a first processor for generating Transaction Capabilities Application Part (TCAP) messages to effectuate the execution of said software module;
- a second processor for loading and providing a simulated telecommunications platform for said software module, said second processor executing said software module in response to received TCAP messages; and
- a packet-data communication link connecting said first processor with said second processor and wherein said communication link transports said TCAP messages from said first processor to said software module within said second processor by encapsulating said TCAP messages into communications packets.

22. The system of claim 21 wherein said first processor comprises a UNIX based work-station simulating a Service Switching Point (SSP) within an IN telecommunications system.

23. The system of claim 22 wherein said second processor comprises a UNIX based computer work-station simulating a Service Control Point (SCP) of an IN telecommunications system.

24. The system of claim 22 wherein said second processor comprises a UNIX based computer work-station simulating a Service Data Point (SDP) of an IN telecommunications system.

25. The system of claim 21 wherein said packet-data communication link supports communication of Transmission Control Point/Internet Protocol (TCP/IP) based packets.

26. The system of claim 21 further comprising:

- a Local Area Network (LAN) card for interfacing said second processor with said packet-data communication link; and
- a conversion module for extracting said encapsulated TCAP messages from said packet-data communications link and interfacing said TCAP messages with said software module.

* * * * *